United States Patent

[11] 3,607,085

| [72] | Inventor | Serafino J. Fusco<br>Pittsfield, Mass. |
|---|---|---|
| [21] | Appl. No. | 854,194 |
| [22] | Filed | Aug. 29, 1969 |
| [45] | Patented | Sept. 21, 1971 |
| [73] | Assignee | General Electric Company |

[54] METHOD AND APPARATUS FOR DETECTING GASES OR VAPORS
9 Claims, 2 Drawing Figs.

[52] U.S. Cl. ................................................. 23/232 R,
23/232 E, 23/254 R, 23/254 E, 204/156, 204/164, 204/312
[51] Int. Cl. ....................................................... G01n 31/00, G01n 33/00
[50] Field of Search ........................................... 23/232, 232 E, 254, 254 E; 204/156, 164, 193, 312

[56] References Cited
UNITED STATES PATENTS

| 2,897,059 | 7/1959 | VanLuik, Jr. | 23/232 E |
| 3,503,711 | 3/1970 | Skala | 23/232 |
| 3,562,128 | 2/1971 | Coffey | 204/193 |

Primary Examiner—Morris O. Wolk
Assistant Examiner—R. E. Serwin
Attorneys—John F. McDevitt, Frank L. Neuhauser, Oscar B. Waddell and Joseph B. Forman ABSTRACT: A method and apparatus for detecting extremely minute quantities of gases and vapors. A condensation nuclei technique of measurement is employed, having a converter that forms a nucleus from a gas-phase reaction between the gaseous material being detected and a volatile reagent in the presence of water. The nuclei forming reaction is augmented by providing a corona discharge in the converter. The reacting materials can be introduced separately or in combination to the converter.

PATENTED SEP21 1971  3,607,085

INVENTOR
SERAFINO J. FUSCO
BY John F. McDevitt
HIS ATTORNEY

METHOD AND APPARATUS FOR DETECTING GASES OR VAPORS

BACKGROUND OF THE INVENTION

Certain chemical compounds are toxic to animal life and their presence in the atmosphere should be detected to avoid a health hazard. One class of such compounds includes insecticides such as S–(1, 2-dicarbathoxyethyl)-0,0-dimethyl-dithiophosphate and 0,0,-diethyl 0-p-nitrophenyl tiophosphate. For detection of these gases or vapors and/or measurement of their concentration in a sample atmosphere it has been found that a condensation nuclei technique can be used.

The condensation nuclei measuring technique detects extremely minute quantities of a gas or vapor from airborne particles of the material being detected on which a fluid such as water, for example, will condense 1, form droplets. A commercially available condensation nuclei counter measures particles as small a 0.001 micron in radius, and detects mass concentrations of one part in 10 + 14. The invisible nuclei are grown into microscopic particles which scatter light in the dark field optical system of a cloud chamber in the instrument. The number of microscopic fluid droplets formed are directly related to the original concentration of toxic gas present in the sample atmosphere and the amount of light scattered by the droplet as measured by electrooptical means in the detection circuit employed.

Some gases have been converted to submicroscopic particles for detection by a condensation nuclei technique. One conversion method is described in U.S. Pat. No. 3,198,721, issued Aug. 3, 1965 and assigned to the assignee of the present invention. The gas to be detected is reacted with a second gas in the sample atmosphere by using a converter having a hot platinum wire, a source of ultraviolet light, a spark cap or some other suitable element. A different conversion is carried out in U.S. Pat. No. 3,117,841, issued Jan. 14, 1964, and also assigned to the assignee for the present invention. The conversion of a particular gas or vapor to be detected is carried out by reacting said material with an aqueous medium selected from the group consisting of water and aqueous solutions of a volatile reactant to form the nuclei. An acid-base chemical reaction or hydrolysis takes place wherein the reaction product is a salt of hydrolizate, respectively, having the proper physical form. It can be seen from the above conversion processes that formation of a product is needed to serve as a nucleating medium for water of some other fluid.

It a principle object of the invention, therefore, to provide a method and apparatus for detecting gases or volatile chemical compounds containing a phosphoryl fluoride grouping or like chemical compounds which can be converted in the same manner.

It is another important object of the invention to provide a method and apparatus for detecting trace amounts of organic gases or vapors having an active phosphoryl or phosphate grouping which can be converted to airborne particulates.

SUMMARY OF THE INVENTION

Briefly, it has been discovered that conversion of the gas or vapor to be detected to particles can be accomplished by gas-phase reaction of the material with a gaseous reagent in the presence of water vapor using corona discharge means. The nucleogenic particles formed upon conversion are measured by otherwise conventional counting techniques. In a preferred embodiment of the invention a sample atmosphere is introduced into the converter containing corona discharge electrodes for gas-phase reaction in the presence of water vapor. The reaction products are then conducted from said converter to means for humidifying the sample atmosphere and thereafter measuring the concentration of water droplets.

DESCRIPTION OF THE PREFERRED EMBODIMENTS

Figure 1:
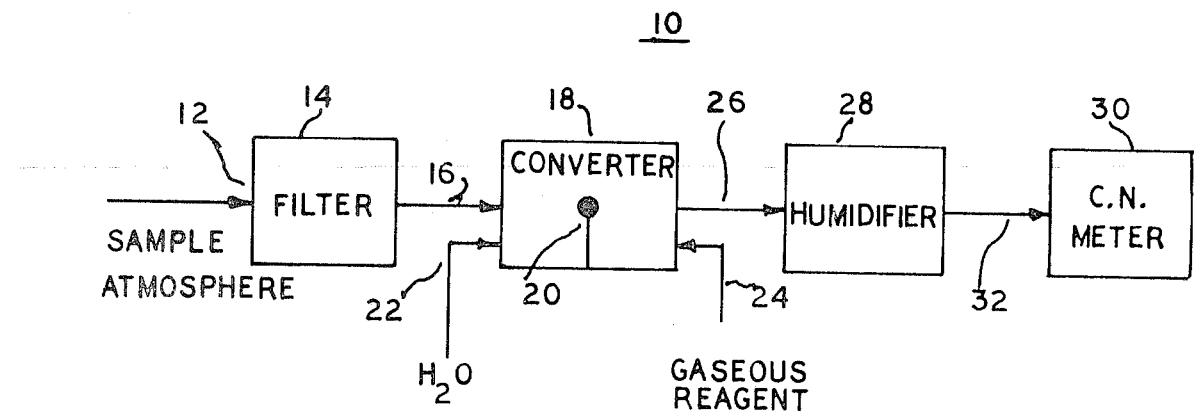
FIG. 1 is a schematic representation of one apparatus for practicing the invention.

As shown in FIG. 1, the detection unit 10 includes intake means 12 for collecting a sample atmosphere to be tested for the gas or vapor. The sample atmosphere is admitted to a filter 14 to remove any airborne particles that might already be contained therein and which could result in false measurement. The filter is connected by suitable conduit means 16 to a converter chamber 18 where the gas-phase reaction takes place. Said converter includes corona discharge electrodes 20 along with separate intake means 22 and 24 for admission of water vapor and a gaseous reagent, respectively, to the converter. The corona discharge electrode arrangement is of known point-source configuration and utilizes chemically inert metal for the electrode material in order to optimize the nuclei forming reaction. A particularly useful electrode configuration comprises a pair of opposed pointed electrode elements which are electrically connected to a power source for discharge across the gap separating said elements. Alternately, a pointed element separated from a ring electrode of opposite electrical polarity can be used. The reaction products formed in the sample atmosphere are next conducted from the converter by conduit means 26 to humidifier 28 wherein microscopic particles are formed by condensation nuclei present. The humidifier is connected to a conventional condensation nuclei meter 30 by conduit means 32.

In operation, a flow rate of the sample atmosphere is maintained in the detection unit by means of a vacuum source (not shown) connected to the condensation nuclei meter. The gas or vapor in the filtered sample atmosphere is reacted in the converter to form submicroscopic condensation nuclei under controlled conditions of corona discharge current, reactant concentrations and relative humidity level. Said control conditions will vary for optimum results dependent upon the particular material being detected so that only representative control conditions are furnished hereinafter.

By way of an example to illustrate the use of the apparatus for detection of a particular anticholenesterase agent, the gas-phase reaction in the converter proceeds as follows:

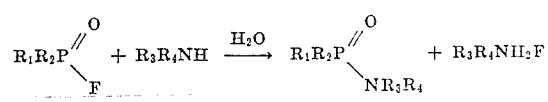

$$R_1R_2P(=O)F + R_3R_4NH \xrightarrow{H_2O} R_1R_2P(=O)NR_3R_4 + R_3R_4NH_2F$$

Where $R_1$ and $R_2$ are organic radicals utilized to obtain the desired toxic action, and $R_3$ and $R_4$ are selected from the group consisting of hydrogen, methyl, ethyl and aminoethyl so that the resulting amine is reasonably volatile. Under the reaction conditions, both above reaction products are condensation nuclei. By maintaining a relative humidity level in the converter between 24–41 percent and operating with ammonia concentrations between 1–30 percent by weight in aqueous solution being admitted as a vapor to the converter it is possible to detect a particular compound reliably at corona current levels between about 5–15 microamperes.

The humidification of condensation nuclei and subsequent detection of the microscopic particles formed are described in great detail in a number of U.S. Pats. including No. 2,684,008, B. Vonnegut, "Method and Apparatus for Measuring the Concentration of Condensation Nuclei," issued July 20, 1954; No. 2,791,901, T. A. Rich, "Method and Apparatus for Measuring Condensation Nuclei," and No. 2,702,471, B. Vonnegut, "-Means for Measuring Individual Aerosol Particles."

Briefly, however, reaction products formed in the sample atmosphere upon conversion have a vapor pressure such that, under proper conditions of pressure and temperature, molecular aggregates are formed which are nucleogenic and hence capable of acting as condensation nuclei. In the humidifier, the sample atmosphere containing the condensation nuclei is humidified by passing over a water surface. In one mode of operation, the sample atmosphere is brought up to 100 percent relative humidity and then brought to the condensation nuclei meter 30 which detects and measures the particle concentration. The manner in which this is achieved is by bringing the humidified nuclei bearing sample atmosphere into a chamber and adiabatically expanding the sample. Expansion cools the sample so that it becomes supersaturated by an amount depending on the degree of expansion. Adiabatic expansion can be achieved by subjecting a sample to a controlled pressure drop in a known manner. Since the supersaturated condition is an unstable one, the sample atmosphere tends to return to a stable condition by condensation of excess water vapor about the condensation nuclei causing them to grow in size so that a cloud of droplets is formed within said meter. By means of an electrooptical system the density of this droplet cloud, and hence the concentration of the gas or vapor being detected in the sample atmosphere is determined. A detailed description of such a condensation nuclei measuring device is described in U.S. Pat. No. 2,684,008 issued July 20, 1954, to B. Vonnegut and assigned to the assignee of the present invention.

Figure 2:
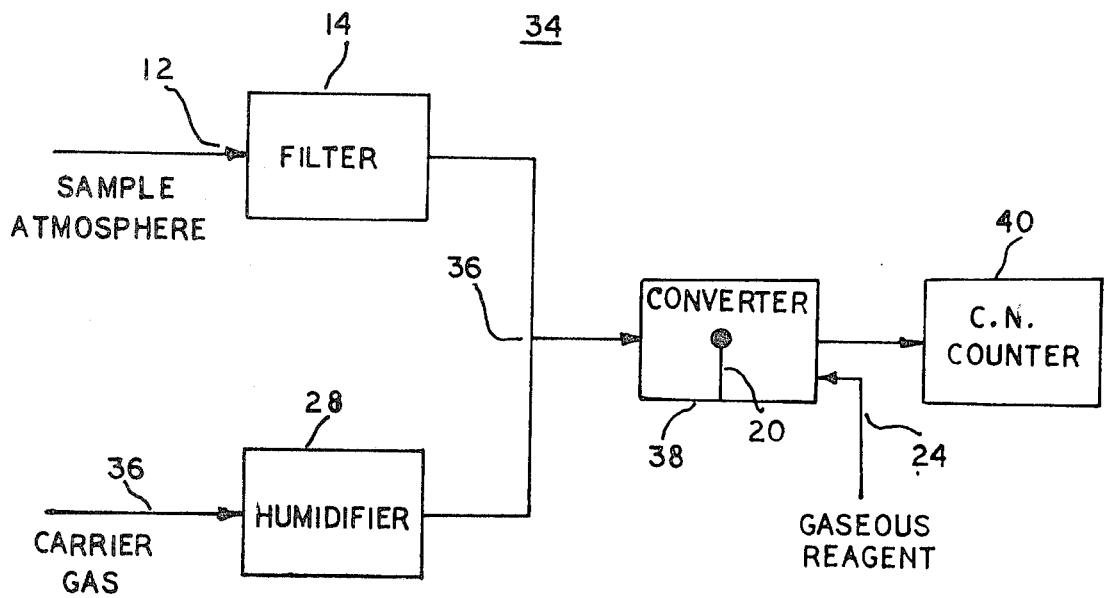
FIG. 2 is a different apparatus which incorporates the features of my invention.

A different detection unit 34, including a commercially available condensation nuclei counter, is shown schematically in FIG. 2. Identical numerals from the preceding FIG. 1 are used to identify comparable structural components in the detection unit to be described. Accordingly, sample collecting means 12 provides a sample atmosphere to filter 14 for removal of background dust and other particles from the gas stream. A carrier gas stream 36 is supplied to humidifier 28 as a source of water vapor for the subsequent gas-water vapor reaction. Said carrier gas can be selected from a number of nonreactive materials, such as helium, nitrogen and the like. The sample atmosphere is combined with the humidified carrier gas stream in conduit means 36 for admission into converter 38. In the converter said mixed gas stream is brought into contact with corona discharge means 20 for reaction with gaseous reagent 24 which has been admitted separately. Alternately, the gaseous reagent could be supplied from a liquid solution contained in the converter. Said converter 38 is connected to a commercially available condensation nuclei counter 40 wherein the sample atmosphere now containing submicroscopic condensation nuclei is humidified for a count of the particle formed. Briefly describing the structural features and operation of the latter device, the condensation nuclei counter uses the properties of the submicroscopic particles to act as a nucleus for the formation of water droplets in a cloud chamber. A gas flow rate of about 100 cubic centimeters per second in the counter permits continuous measurement upon an entering sample atmosphere. After entering the condensation nuclei counter, the gas sample containing nuclei is humidified to 100 percent. It enters an expansion chamber through a valve and is then expanded adiabatically. The result is a rapid rise in the relative humidity to about 400 percent which causes water vapor to condense on any nuclei in the sample atmosphere. This condensation occurs in a few milliseconds causing the invisible nuclei to grow into microscopic particles which scatter light in a dark field optical system. The intensity of the light scattered onto a photomultiplier tube in the detecting circuit is directly related to the number of microscopic water droplets formed. The sample is then flushed from the cloud chamber and discharged through the exhaust of a vacuum pump. The complete operation form original humidification to discharge occurs at a rate of about 5 cycles per second. The range of the condensation nuclei counter is sufficient to measure $10^7$ particles per cubic centimeter.

While particular embodiments of this invention have been shown it will be understood that the invention is not limited thereto since modifications both in the method and instrumentalities employed may be made. For example, all materials needed for the conversion can be introduced in a single gas stream to the converter. It is contemplated by the appended claims to cover any such modifications as fall within the true spirit and scope of the invention.

What is claimed as new and desired to be secured by Letters Patent of the United States is:

1. An apparatus for detecting traces of a reactive vapor in a sample atmosphere which comprises:
    a. collecting means to provide a sample atmosphere to the apparatus
    b. means to introduce water into the sample atmosphere
    c. a converter having corona discharge means for gas-phase reaction of any vapor in the sample atmosphere with a gaseous reagent at the corona discharge electrodes to form condensation nuclei and
    d. means to detect the condensation nuclei formed by the gas-phase reaction.

2. An apparatus as in claim 1 wherein the gaseous reagent is contained in the sample atmosphere when admitted to the converter.

3. An apparatus as in claim 1 wherein filtering means are employed to remove particulates from the sample atmosphere before admission to the converter.

4. A apparatus as in claim 1 wherein the means for introducing water into the sample atmosphere is a humidifier connected between the collecting means and the converter.

5. An apparatus as in claim 1 wherein the converter contains a liquid solution of a volatile reagent for gas phase reaction with any vapor in the sample atmosphere.

6. A method for detecting traces of a reactive vapor in a sample atmosphere which comprises
    a. introducing water into the sample atmosphere being tested for the vapor
    b. reacting any vapor in the sample atmosphere with a gaseous reagent by corona discharge means to form condensation nuclei and
    c. detecting the condensation nuclei by condensation nuclei measuring technique.

7. A method as in claim 6 wherein the sample atmosphere is humidified before reaction with the gaseous reagent.

8. A method as in claim 7 wherein the gaseous reagent is obtained from an aqueous solution of a volatile reagent.

9. A method as in claim 6 wherein the sample atmosphere, the water and the gaseous reagent are all introduced separately into a converter containing the corona discharge means.